Patented Oct. 10, 1939

UNITED STATES PATENT OFFICE 2,175,815

COPPER COMPLEX COMPOUNDS OF DISAZO DYESTUFFS OF THE STILBENE SERIES

Hans Schindhelm, Frankfort-on-the-Main-Fechenheim, Germany, assignor to General Aniline Works, Inc., New York, N. Y., a corporation of Delaware No Drawing. Application April 15, 1938, Serial No. 202,291. In Germany April 19, 1937

4 Claims. (Cl. 260—148)

The present invention relates to new copper complex compounds of disazo dyestuffs of the stilbene series, more particularly to those of the general formula:

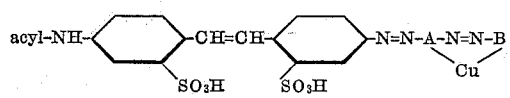

wherein acyl means the radicle of a carboxylic acid selected from the group consisting of the aliphatic and the benzene series and A and B stand for sulfonated radicles of the naphthalene series which contain in o-position to the azo group a group capable of being metallized.

The aforesaid new copper complex compounds are obtained according to the present invention for instance by the following process of manufacture. 4-nitro-4'-aminostilbene-2,2'-disulfonic acid is acylated, then the nitro group of the 4-nitro-4'-acylaminostilbene-2,2'-disulfonic acid obtained is reduced, the 4-amino-4'-acylaminostilbene-2,2'-disulfonic acid formed is diazotized and its diazo compound is combined with a diazotizable amine of the naphthalene series containing in o-position to the diazotizable amino group a group capable of being metallized. The amino azodyestuff thus obtained is further diazotized and the diazo compound formed is combined with a compound of the naphthalene series containing in o-position to the coupling position a group capable of being metallized. Then the disazodyestuff formed is converted in the usual manner into the corresponding copper complex compound.

The single stages of the aforesaid process may also be performed in another sequence. Thus, for example, at first a nitrostilbene-disazodyestuff may be prepared the nitro group of which is then reduced to the amino group. Hereupon the aminostilbene-disazodyestuff formed is acylated and then converted into the corresponding copper complex compound.

The new copper complex compounds prepared according to the present invention are dyestuffs of valuable tinctorial properties. They yield on vegetable fibers green to greenish gray shades of excellent fastness to light.

In order to further illustrate my invention the following examples are given, the parts being by weight and all temperatures in degrees centigrade.

Example 1

336 parts of 4-nitro-4'-aminostilbene-2,2'-disulfonic acid are dissolved in about 3800 parts of water. The solution is neutralized and then 140 parts of acetic acid anhydride are added, while stirring. When the acylation is complete, the solution is heated to about 90° and about 2000 parts of sodium chloride are added. The 4-nitro-4'-acetylaminostilbene-2,2'-disulfonic acid formed precipitates from the solution while cooling. It is filtered off and washed with an aqueous sodium chloride solution. Then it is reduced in the usual manner by means of iron and acetic acid.

The 4-amino-4'-acetylaminostilbene-2,2'-disulfonic acid thus obtained is diazotized in the usual manner and the diazo compound formed is combined with an aqueous solution of 270 parts of 1-amino-2-ethoxynaphthalene-6-sulfonic acid in the presence of sodium carbonate. When the combination is complete, the aminoazodyestuff formed is isolated, purified and further diazotized. The diazo compound obtained is combined with an aqueous solution of 310 parts of the sodium salt of 2-acetylamino-5-hydroxynaphthalene-7-sulfonic acid containing about 10 percent by volume of pyridine. The disazodyestuff thus obtained is precipitated by the addition of sodium chloride, filtered off and, if necessary, purified by dissolving it in water and reprecipitating it from this solution. Then it is dissolved in water, the aqueous solution of 300 parts of crystallized copper sulfate is added and the mixture is heated to boiling for about 78 hours in the presence of sodium acetate, whereby the formation of the copper complex compound of the formula:

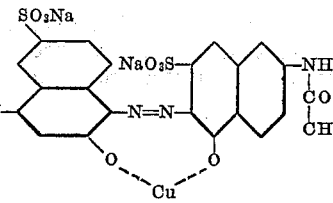

is performed. It is, when dry, a dark powder, soluble in concentrated sulfuric acid with a greenish-gray and in water with a bluish-gray color, dyeing cotton grayish-green shades of excellent fastness to light.

By employing instead of the sodium salt of 2-acetylamino-5-hydroxynaphthalene-7-sulfonic acid in the above example the corresponding amount of the sodium salt of 2-succinoylamino-5-hydroxynaphthalene-7-sulfonic acid, a copper complex compound of the formula:

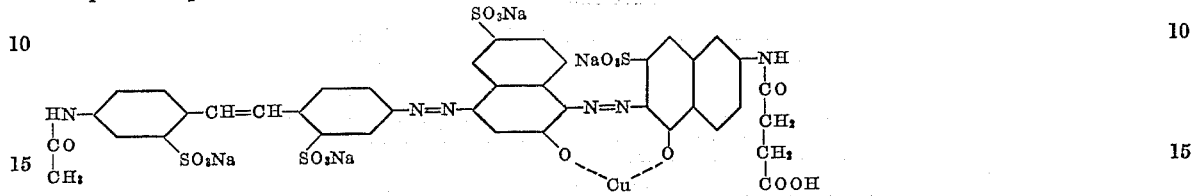

is obtained. It is, when dry, a dark powder, soluble in concentrated sulfuric acid with a greenish-gray and in water with a bluish-gray color,

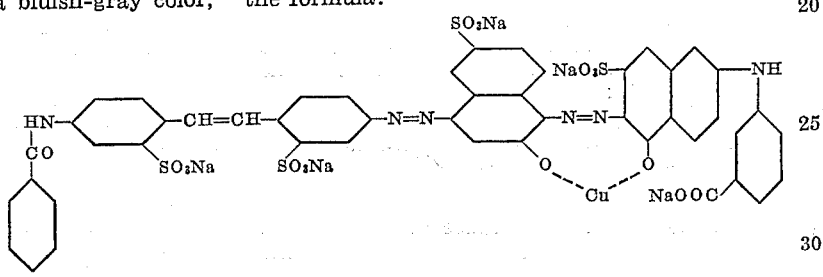

dyeing cotton greenish-gray shades of excellent fastness to light.

Similar valuable copper complex compounds are obtained by employing as end component for the manufacture of the stilbene disazodyestuff instead of 2-acetylamino-5-hydroxynaphthalene-7-sulfonic acid analogous compounds such as for example 2-benzoylamino-5-hydroxynaphthalene-7-sulfonic acid, 2-(2'-carboxybenzoylamino)-5-hydroxynaphthalene-7-sulfonic acid, 2-chloracetylamino-5-hydroxynaphthalene-7-sulfonic acid, 2-methoxyacetylamino-5-hydroxynaphthalene-7-sulfonic acid and the like.

*Example 2*

336 parts of 4-nitro-4'-aminostilbene-2,2'-disulfonic acid are dissolved in about 4000 parts of water. The solution is neutralized and mixed with a concentrated aqueous solution of 200 parts of sodium carbonate. Then 180 parts of benzoylchloride are slowly added during about one hour, while stirring, at about 15–25°. When the acylation is complete, the 4-nitro-4'-benzoylaminostilbene-2,2'-disulfonic acid formed is precipitated by the addition of sodium chloride, filtered off, purified and then reduced in the usual manner by means of iron and acetic acid.

The 4-amino-4'-benzoylaminostilbene-2,2'-disulfonic acid thus obtained is diazotized in the usual manner and the diazo compound formed is combined with an aqueous solution of 267 parts of 1-amino-2-ethoxynaphthalene-7-sulfonic acid in the presence of sodium carbonate. When the combination is complete, the aminoazo dyestuff formed is separated and further diazotized. The diazo compound obtained is combined with an aqueous solution of 390 parts of the sodium salt of 2-(3'-carboxyphenylamino)-5-hydroxynaphthalene-7-sulfonic acid containing about 10 percent by volume of pyridine. The combination being complete, the disazodyestuff formed is isolated, purified and converted into the corresponding copper complex compound in an analogous manner as described in Example 1. The copper complex compound thus obtained corresponds to the formula:

It is, when dry, a dark powder, soluble in concentrated sulfuric acid with a green and in water with a bluish-green color, dyeing vegetable fibers greenish-gray shades of good fastness to light.

Similar valuable dyestuffs are obtained by replacing benzoylchloride, in the above example, by its substitution derivatives such as, for example, 3-methoxybenzoylchloride, 4-chlorobenzoylchloride and the like.

By employing as end component for the manufacture of the disazodyestuff instead of 2-(3'-carboxyphenylamino)-5-hydroxynaphthalene-7-sulfonic acid other compounds of the naphthalene series containing in o-position to the coupling position a group capable of being metallized, analogous dyestuffs distinguished by similar good properties are obtained.

I claim:

1. Copper complex compounds of disazodyestuffs of the stilbene series of the general formula:

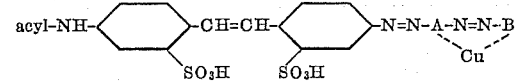

wherein acyl means the radicle of a carboxylic acid selected from the group consisting of the aliphatic and the benzene series and A and B stand for sulfonated radicles of the naphthalene series which contain in o-position to the azo group a group capable of being metallized, which copper complex compounds dye vegetable fibers green to greenish gray shades of excellent fastness to light.

2. The copper complex compound of the formula:

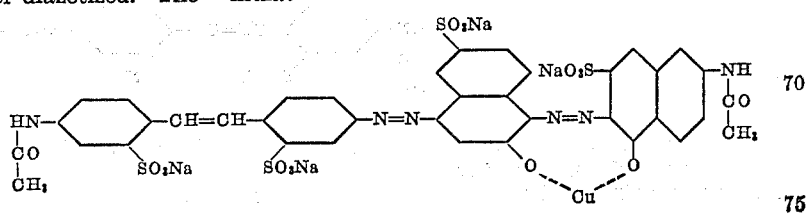

which is, when dry, a dark powder, soluble in concentrated sulfuric acid with a greenish-gray and in water with a bluish-gray color, dyeing vegetable fibers grayish-green shades of excellent fastness to light.

3. The copper complex compound of the formula:

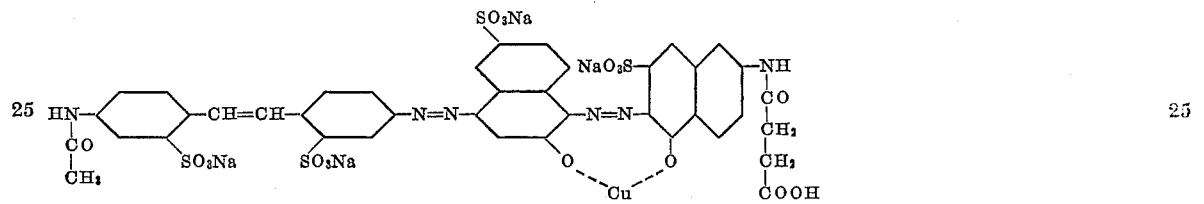

which is a dark powder, soluble in concentrated sulfuric acid with a greenish-gray and in water with a bluish-gray color, dyeing vegetable fibers greenish-gray shades of excellent fastness to light.

4. The copper complex compound of the formula:

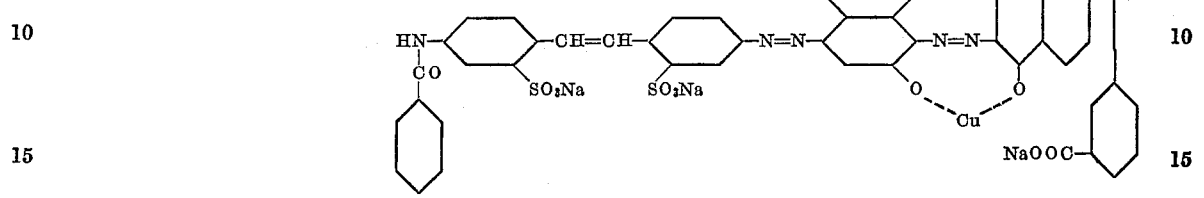

which is a dark powder, soluble in concentrated sulfuric acid with a green and in water with a bluish green color, dyeing vegetable fibers greenish gray shades of good fastness to light.

HANS SCHINDHELM.